United States Patent
Haecker et al.

(10) Patent No.: US 8,950,942 B2
(45) Date of Patent: Feb. 10, 2015

(54) ECCENTRIC BEARING

(75) Inventors: Juergen Haecker, Schwieberdingen (DE); Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/695,662

(22) PCT Filed: Mar. 10, 2011

(86) PCT No.: PCT/EP2011/053582
§ 371 (c)(1),
(2), (4) Date: Mar. 14, 2013

(87) PCT Pub. No.: WO2011/138073
PCT Pub. Date: Nov. 10, 2011

(65) Prior Publication Data
US 2013/0195390 A1    Aug. 1, 2013

(30) Foreign Application Priority Data
May 5, 2010 (DE) .......... 10 2010 028 581

(51) Int. Cl.
*F16C 19/50* (2006.01)
*F16C 33/42* (2006.01)
(Continued)

(52) U.S. Cl.
CPC . *F16C 19/50* (2013.01); *F04B 9/04* (2013.01); *F04B 9/045* (2013.01); *F16C 3/22* (2013.01); *F16C 23/10* (2013.01); *F16C 33/3887* (2013.01)
USPC ........... 384/447; 384/526; 384/564; 384/575; 384/577; 384/604

(58) Field of Classification Search
CPC .................................................. F16C 33/3887
USPC ......... 384/416, 428, 432, 445, 447, 475, 548, 384/575, 593, 604, 526, 564, 577; 29/898.063, 898.067
See application file for complete search history.

(56) References Cited

U.S. PATENT DOCUMENTS 1,947,703 A * 2/1934 Fishburn .................. 192/45.003
2,029,244 A * 1/1936 Linder ..................... 192/45.003
(Continued)

FOREIGN PATENT DOCUMENTS

EP    1788244 A2 * 5/2007 ............... F04B 1/04
FR    2 637 660 A1    4/1990
(Continued)

OTHER PUBLICATIONS

International Search Report corresponding to PCT Application No. PCT/EP2011/053582, mailed May 31, 2011 (German and English language document) (5 pages).

*Primary Examiner* — Marcus Charles
(74) *Attorney, Agent, or Firm* — Maginot, Moore & Beck LLP

(57) ABSTRACT

An eccentric bearing for an electrohydraulic piston pump assembly of a vehicle brake system includes a shaft configured to be driven in rotation about its axis, a bearing ring which is eccentric relative to the shaft, and rolling bodies between the bearing ring and the shaft. The rolling bodies have different diameters corresponding to a varying width of a gap between the bearing ring and the shaft. When the shaft is driven in rotation, an eccentricity of the bearing ring revolves around the shaft at half of the rotational speed of the shaft and drives pump pistons to perform a reciprocating movement. A rolling body cage is open between the two largest rolling bodies. The rolling body cage loads the rolling bodies into the tapering gap and ensures that the rolling bodies revolve on the shaft when the shaft is driven.

9 Claims, 1 Drawing Sheet

(51) Int. Cl.
*F04B 9/04* (2006.01)
*F16C 3/22* (2006.01)
*F16C 23/10* (2006.01)
*F16C 33/38* (2006.01)

(56) References Cited

U.S. PATENT DOCUMENTS

| | | | |
|---|---|---|---|
| 2,931,249 A * | 4/1960 | Walton | 74/640 |
| 3,038,767 A * | 6/1962 | Greby | 384/575 |
| 3,397,332 A * | 8/1968 | Pitner | 310/90 |
| 4,776,708 A * | 10/1988 | Carlson | 384/447 |
| 2007/0223854 A1 * | 9/2007 | Waseda et al. | 384/584 |
| 2009/0123304 A1 * | 5/2009 | Alaze | 417/273 |
| 2009/0175569 A1 * | 7/2009 | Murata et al. | 384/475 |

FOREIGN PATENT DOCUMENTS

| | | | | |
|---|---|---|---|---|
| JP | 5171443 A * | 6/1976 | | F16C 33/46 |
| JP | 56-147927 A | 11/1981 | | |
| JP | 58-189815 U | 12/1983 | | |
| JP | 61215480 A * | 9/1986 | | F04C 18/02 |
| JP | 2-168016 A | 6/1990 | | |
| JP | 5-87327 U | 11/1993 | | |
| JP | 2007-170538 A | 7/2007 | | |

* cited by examiner

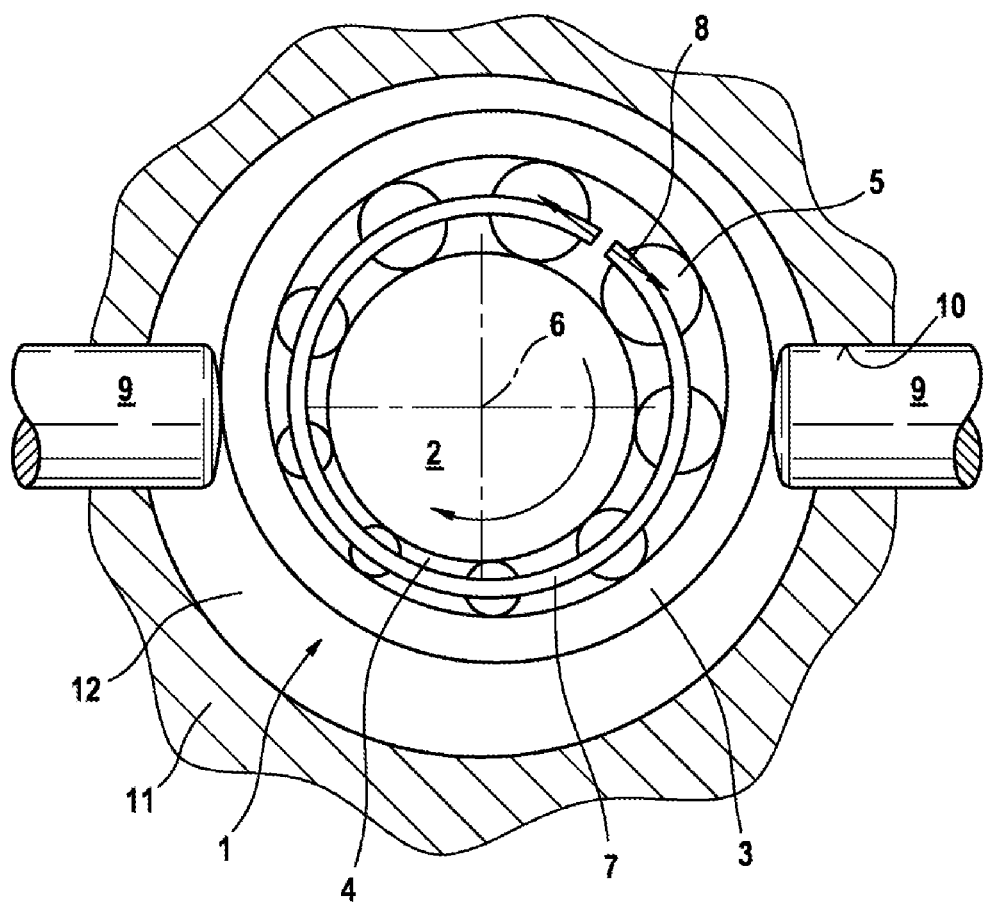

ECCENTRIC BEARING

CROSS REFERENCE TO RELATED APPLICATIONS

This application is a 35 U.S.C. §371 National Stage Application of PCT/EP2011/053582, filed on Mar. 10, 2011, which claims the benefit of priority to Serial No. DE 10 2010 028 581.1, filed on May 5, 2010 in Germany, the disclosures of which are incorporated herein by reference in their entirety.

BACKGROUND

The disclosure relates to an eccentric bearing having the features described below. The eccentric bearing according to the disclosure is provided, in particular, for an electrohydraulic piston pump unit of a hydraulic brake system of a motor vehicle. Such pump units are used to generate a hydraulic brake pressure for brake actuation in slip-controlled and/or power brake systems.

Known eccentric bearings have an eccentric shaft which is mounted integrally, or rigidly in some other way, and eccentrically on a motor shaft of an electric motor or on an output shaft of a transmission that can be driven by the electric motor. Arranged on the eccentric shaft is a rolling contact bearing having a bearing ring concentrically surrounding the eccentric shaft and having rolling elements arranged around the shaft in a gap between the eccentric shaft and the bearing ring, generally but not necessarily at equal spacings. The rolling elements are usually rollers or needles although they can also be other rolling elements, e.g. balls. The bearing ring can be understood as an outer ring, and there can be an inner ring, said inner ring being press fitted onto the eccentric shaft for example. However, an inner ring is not necessary: the rolling elements can also roll directly on the eccentric shaft. One or more pump pistons of the pump piston unit rest by means of the ends thereof against the outside of the bearing ring. The pump pistons are pressed into contact with the bearing ring from the outside by springs, for example.

When driven in rotation, the eccentric shaft performs a movement on an orbital path owing to its eccentricity, rotating about itself in the process. Owing to the movement of the eccentric shaft on the orbital path, the bearing ring also moves on an orbital path or on the same orbital path and thereby drives the pump pistons resting externally against it to perform the desired reciprocating motion in order to deliver brake fluid or, more generally, fluid through alternate suction and displacement, as known from piston pumps. Owing to its rolling contact bearing arrangement, the bearing ring does not rotate with the eccentric shaft.

In electrohydraulic piston pump units for hydraulic brake systems of motor vehicles, the eccentric bearings convert a rotary motion of an electric motor or of an output shaft of a transmission into a reciprocating motion in order to drive the pump pistons.

SUMMARY

The eccentric bearing according to the disclosure having the features described below has a shaft, which can be driven rotationally, on which a rolling contact bearing having a bearing ring, which surrounds the shaft, and rolling elements, which are arranged around the shaft in a gap between the shaft and the bearing ring, wherein the rolling elements can be arranged at equal spacings, although they do not have to be. A rolling element cage holds the rolling elements at their relative spacings, it being possible for the spacings between the rolling elements to be the same or different. In contrast to known eccentric bearings, the shaft of the eccentric bearing according to the disclosure is provided concentrically with respect to the axis of rotation thereof, even if it is conceivable and not excluded by the disclosure that the shaft could be eccentric with respect to the axis of rotation thereof. Instead of or, if appropriate, in addition to an eccentricity of the shaft, the bearing ring is eccentric with respect to the shaft, and the rolling elements have different diameters according to a differing gap width between the shaft and the bearing ring owing to the eccentricity of the bearing ring with respect to the shaft. The rolling elements have diameters of the same size as the width of the gap between the bearing ring and the shaft at the circumferential location at which the respective rolling element is located.

When the shaft is driven in rotation, the rolling elements roll on the shaft and in the bearing ring and revolve around the shaft in the manner known from rolling contact bearings. During this process, the rolling elements of large diameter push the bearing ring away from the shaft, and the bearing ring approaches the shaft on the opposite side, where the rolling elements of small diameter are located. The changing gap width as it were revolves around the rotationally driven shaft together with the rolling elements, i.e. the widest, the narrowest and every other gap width revolve around the shaft with the rolling elements. The bearing ring moves on an orbital path around the shaft with an eccentricity with respect to the shaft. A rotary motion of the shaft is converted into a reciprocating motion of one or more pump pistons resting against the outside of the bearing ring. The rolling elements revolve around the shaft with a lower peripheral speed than the speed of rotation of the shaft, and the speed at which the bearing ring moves on its orbital path is likewise reduced. The eccentric bearing according to the disclosure has a speed reduction, with a speed of revolution of the eccentricity of the bearing ring being less than the speed of rotation of the shaft when the bearing ring is fixed against relative rotation. The speed reduction has the advantage that a higher speed of rotation of the drive is possible, allowing the use of a smaller and lighter electric motor for the same power.

Another advantage of the eccentric bearing according to the disclosure is its simple and low-cost construction.

The eccentric bearing according to the disclosure is provided, in particular, for the application explained in an electrohydraulic piston pump unit for generating a brake pressure in a hydraulic brake system of a motor vehicle, where it converts the rotary motion of an electric motor into a reciprocating motion for driving pump pistons. However, the disclosure is not restricted to this application but is also directed to the eccentric bearing as such.

The description below relates to advantageous embodiments and developments of the disclosure indicated below.

The rolling element cage is preferably springy, pressing the rolling elements inward against the shaft and outward against the bearing ring and/or in the circumferential direction. At least one embodiment envisages that the rolling element cage presses the rolling elements in the direction of the narrowing gap between the shaft and the bearing ring. These embodiments of the disclosure have the advantage that the rolling elements are pressed with a preload against the shaft and the bearing ring or, in the case of pressure directed into the narrowing gap, both against the shaft and against the bearing ring, even when there is play between the rolling elements and the shaft and/or the bearing ring. Even if the preload is small, this embodiment of the disclosure ensures that the rolling elements roll on the shaft and in the bearing ring and, as a result, revolve around the shaft in a manner comparable to the planet wheels in a planetary transmission when the shaft (or the bearing ring) is driven in rotation. The revolution of the rolling elements around the shaft ensures the desired movement of the bearing ring on the orbital path around the shaft.

To provide a springy design, at least one embodiment envisages that the rolling element cage is open at one point on the circumference. This embodiment of the rolling element cage is comparable with a retention ring, such as a snap ring or a Seeger circlip ring. The configuration of the rolling element cage with an opening at one point also simplifies the assembly of the eccentric bearing according to the disclosure. According to another embodiment, the rolling element cage is open between the two rolling elements with the largest diameters and presses the rolling elements in both circumferential directions in the direction of the narrowing gap between the shaft and the bearing ring. If the eccentric bearing has only one rolling element of maximum diameter, the rolling element cage is open between the latter and an adjacent rolling element.

BRIEF DESCRIPTION OF THE DRAWINGS

The disclosure is explained in greater detail below with reference to an illustrative embodiment shown in the drawing. The single figure shows an eccentric bearing according to the disclosure in end view.

DETAILED DESCRIPTION

The eccentric bearing 1 according to the disclosure, which is shown in the drawing, has a shaft 2, which is surrounded by a bearing ring 3. Rollers 5 are arranged as rolling elements around the shaft 2, in a gap 4 between the bearing ring 3 and the shaft 2. The bearing ring 3 and the rollers 5, possibly together with the shaft 2, can be understood as a rolling contact bearing. The shaft 2 can be driven in rotation about the axis 6 thereof, which is simultaneously the axis of rotation thereof, by an electric motor, which is not visible in the drawing because it is behind the plane of the drawing. The shaft 2 does not have any eccentricity. It can be the end of a motor shaft of the electric motor, for example.

The bearing ring 3 is eccentric with respect to the shaft 2, and a width of the gap 4 between the bearing ring 3 and the shaft 2 varies in the circumferential direction. Starting from a maximum gap width, which is at the top right in the drawing, the gap width decreases in both circumferential directions to a minimum gap width, which is opposite the maximum gap width, i.e. at the bottom left in the drawing.

The rollers 5 which form the rolling elements have different diameters according to the different gap width. The diameters of the rollers 5 are each as large as the width of the gap 4 between the bearing ring 3 and the shaft 2 at the point where the respective roller 5 is located.

When the shaft 2 is driven in rotation, the rollers 5 roll on a circumference of the shaft 2 and, in the process, revolve around the shaft 2 at a lower speed of revolution than the speed of rotation of said shaft. The maximum gap width of the gap 4 between the bearing ring 3 and the shaft 2 revolves together with the two rollers 5 with the largest diameters. The minimum gap width of the gap 4 between the bearing ring 3 and the shaft 2 likewise revolves around the shaft 2 with the two rollers 5 with the smallest diameters. In other words, an eccentricity of the bearing ring 3 in relation to the shaft 2 revolves around the shaft 2 when the shaft 2 is driven in rotation, with the speed of revolution of the eccentricity being less than the speed of rotation of the shaft 2 when the bearing ring 3 does not corotate. The bearing ring 3 moves on an orbital path around the axis 6 of the shaft 2, which is simultaneously the axis of rotation of the latter, wherein a speed of the gyration of the bearing ring 3 is less than the speed of rotation of the shaft 2 and there is therefore a speed reduction.

The rollers 5 are accommodated in a rolling element cage 7, which holds them at their spacing relative to one another. Between the two rollers 5 with the largest diameters, the rolling element cage 7 is open and is thus of springy design, similar to a retention ring of the kind known as a snap ring or as a Seeger circlip ring in mechanical engineering. The rolling element cage 7 has a prestress and pushes the two rollers 5 with the largest diameters away from one another in the circumferential direction, as indicated by the arrows 8. Owing to its prestress, the rolling element cage 7 pushes the rollers 5 in both circumferential directions in the direction of the narrowing gap 4 between the shaft 2 and the bearing ring 3. Owing to its prestress, the rolling element cage 7 exerts a preload against the shaft 2 and against the bearing ring 3, with the result that the rollers 5 rest against the shaft 2 and against the bearing ring 3 and roll on the shaft 2 and in the bearing ring 3 when the shaft 2 is driven in rotation and revolve around the shaft 2 at half the speed of rotation of the shaft 2. Moreover, the springy design of the rolling element cage 7 open at one point simplifies the assembly of the eccentric bearing 1.

The rollers 5 are accommodated rotatably in rectangular apertures, referred to as pockets, in the rolling element cage 7. Such rolling element cages 7 are known from rolling contact bearings and are also referred to as bearing cages or just as cages, for short. In the case of roller bearings, the rolling contact bearing cages are also referred to as roller cages while, in the case of ball bearings, they are referred to as ball cages.

Pump pistons 9 rest by means of the ends thereof on the outside of the bearing ring 3. The pump pistons 9, of which only the ends are shown in the drawing, are arranged radially with respect to the shaft 2 and are pressed against the bearing ring 3 from the outside by piston springs (not shown). The pump pistons 9 are accommodated in pump bores 10 of a pump housing 11 in such a way that they can be moved axially, i.e. radially with respect to the shaft 2. The eccentric bearing 1 is located in a cylindrical eccentric space 12 of the pump housing 11, between the two pump pistons 9, which are arranged opposite one another, i.e. in a horizontally opposed arrangement, in the illustrative embodiment. Driving the shaft 2 in rotation causes the bearing ring 3 to move on an orbital path around the axis 6 and the axis of rotation of the shaft 2 at a lower speed than the speed of rotation of the shaft 2, without rotating with the shaft 2. The gyration of the bearing ring 3 drives the pump pistons 9 to perform a reciprocating motion. The eccentric bearing 1 thus converts a rotary motion of the shaft 2 into a reciprocating motion for the purpose of driving the pump pistons 9. The pump housing 11 is part of a so-called hydraulic block, in which not only the pump pistons 9 but also other hydraulic components that are not shown, such as solenoid valves of a slip control device for a hydraulic brake system of a motor vehicle are arranged and hydraulically interconnected. Such hydraulic blocks are known per se and will not be explained further here.

The invention claimed is:
1. An eccentric bearing for converting a rotary motion into a reciprocating motion, comprising:
   a shaft configured to be driven rotationally;
   a bearing ring, which eccentrically surrounds the shaft;
   a plurality of rolling elements arranged around the shaft in
     a gap defined between the shaft and the bearing ring, wherein each of the rolling elements has one of a variety of diameters according to a variable width of the gap; and a rolling element cage configured to hold the plurality of rolling elements at relative spacings with respect to one another, wherein the variable width of the gap includes a maximum gap width and a minimum gap width located opposite the shaft from the maximum gap width, and wherein the rolling element cage exerts a spring action on the rolling elements in a narrowing direction of the gap defined circumferentially from the maximum gap width toward the minimum gap width.

2. The eccentric bearing as claimed in claim 1, wherein the rolling element cage is open at a point on a circumference of the rolling element cage corresponding to the maximum gap width.

3. The eccentric bearing as claimed in claim 1, wherein the shaft has a central axis and is configured to be driven rotationally about the central axis.

4. The eccentric bearing of claim 1, wherein:
the plurality of rolling elements includes largest rolling elements having largest diameters, and
the rolling element cage is open between the largest rolling elements.

5. An eccentric bearing for converting a rotary motion into a reciprocating motion, comprising:
a shaft configured to be driven rotationally;
a bearing ring, which eccentrically surrounds the shaft;
a plurality of rolling elements connected to the rolling element cage and arranged around the shaft in a gap between the shaft and the bearing ring wherein each of the rolling elements has one of a variety of diameters according to a variable width of the gap; and
a rolling element cage configured to hold the plurality of rolling elements at relative spacings with respect to one another,
wherein the rolling element cage is springy,
wherein the rolling element cage is open at one point on a circumference,
wherein the plurality of rolling elements includes largest rolling elements having largest diameters, and
wherein the rolling element cage is open between the largest rolling elements.

6. The eccentric bearing as claimed in claim 5, wherein the shaft has a central axis and is configured to be driven rotationally about the central axis.

7. The eccentric bearing of claim 5, wherein:
wherein the variable width of the gap includes a maximum gap width and a minimum gap width located opposite the shaft from the maximum gap width, and
wherein the rolling element cage exerts a spring action on the rolling elements in a narrowing direction of the gap defined circumferentially from the maximum gap width toward the minimum gap width.

8. An eccentric bearing for converting a rotary motion into a reciprocating motion, comprising:
a shaft configured to be driven rotationally;
a bearing ring, which eccentrically surrounds the shaft;
a plurality of rolling elements arranged around the shaft in a gap defined between the shaft and the bearing ring, wherein each of the rolling elements has one of a variety of diameters according to a variable width of the gap; and
a rolling element cage configured to hold the plurality of rolling elements at relative spacings with respect to one another, wherein:
the plurality of rolling elements includes largest rolling elements having largest diameters, and
the rolling element cage is open between the largest rolling elements.

9. The eccentric bearing as claimed in claim 8, wherein the shaft has a central axis and is configured to be driven rotationally about the central axis.

* * * * *